June 13, 1933.  G. CATTANEO  1,913,658
RECOVERY OF SO2 USED IN OIL REFINING
Filed April 20, 1930   2 Sheets-Sheet 1

Inventor
Giuseppe Cattaneo

June 13, 1933.　　　G. CATTANEO　　　1,913,658
RECOVERY OF SO₂ USED IN OIL REFINING

Filed April 20, 1930　　2 Sheets-Sheet 2

Inventor
Giuseppe Cattaneo
By
his Attorneys

Patented June 13, 1933

1,913,658

UNITED STATES PATENT OFFICE

GIUSEPPE CATTANEO, OF HILVERSUM, NETHERLANDS, ASSIGNOR TO EDELEANU GESELLSCHAFT M. B. H., A CORPORATION OF GERMANY

RECOVERY OF SO₂ USED IN OIL REFINING

Application filed April 20, 1932, Serial No. 606,501, and in Germany May 2, 1931.

This invention aims to provide an improved method whereby the liquid-$SO_2$ employed for treating hydrocarbons (as in the well known Edeleanu refining process) may be recovered in a sufficiently pure state for further use.

In practice, the liquid-$SO_2$ utilized in the treatment of petroleum fractions in a refining plant is recovered and reused, so that a continuous, cyclical operation is effected, and hence it is necessary that this recovered $SO_2$ be obtained in a substantially pure form so as not to interfere with the operation of the cycle.

The Edeleanu system consists, in brief, in dissolving the unsaturated and aromatic constituents of hydrocarbon fractions by means of liquid-$SO_2$. A raffinate is secured which comprises substantially all of the saturated constituents, together with a relatively small quantity of liquid-$SO_2$ (about 12 to 15 per cent), and an extract which comprises the unsaturated and aromatic constituents dissolved in a relatively large amount of liquid-$SO_2$.

The raffinate and extract, respectively, are then freed of $SO_2$ by multi-stage distillation or evaporation. The first stage in each case is usually operated at a pressure (45 to 75 pounds per square inch) sufficient to permit of the direct condensation of the evolved $SO_2$ vapors at cooling water temperature. The second stage is operated at atmospheric pressure and the last stage under vacuum, the evolved $SO_2$ vapors being compresed to condenser-pressure for condensation at cooling water temperature. The liquid-$SO_2$ so recovered is returned to the treatment cycle and thus utilized over and over again.

The practice has been to purify the $SO_2$ of water and hydrocarbons, which pass off with it from the evaporators, by subjecting the $SO_2$ vapors from the atmospheric-pressure and vacuum stages to cooling, for removal of hydrocarbons, and then to drying for removal of water. Under prevailing practice, the $SO_2$ vapors from the condenser-pressure evaporators are directly condensed and reused.

This procedure has the advantage that the apparatus for separating out the hydrocarbons and water from the $SO_2$ is operated at a low pressure, insuring safety, but the disadvantage is that only a comparatively small part of the circulating $SO_2$ is purified, since it has been found that the $SO_2$ vapors coming from the condenser-pressure evaporators contain a comparatively large percentage of water and light oil and these $SO_2$ vapors are not purified.

In order to render the drying and purification of the $SO_2$ vapors more effective, and at the same time continue the use of the drying and cleaning devices only in the low pressure parts of the system, it is necessary to prevent the water and light oils from the condenser-pressure stages from passing with $SO_2$ vapors to the $SO_2$ condenser.

The present invention solves this problem by contacting the $SO_2$ vapors derived from the raffinate and extract condenser-pressure evaporators with part of the unevaporated, cool, raffinate and extract, respectively, from the mixer. The contacting is effected in a suitable contact apparatus, such as a scrubber, in which the $SO_2$ vapors are passed countercurrently to the contacting liquid. The contact liquid, together with the oil and water removed from the $SO_2$ vapors, is then introduced into the proper evaporating system, either directly into the condenser-pressure evaporator or into the still unheated input liquid to this stage. As there is a constant stream of raffinate or extract, as the case may be, flowing from the first stage evaporator to the succeeding stages, the water and light oil concentration in the first stage will not build up sufficiently to interfere with its operation.

In the accompanying drawings, wherein several embodiments of the invention are shown for purposes of illustration, and in which like numerals designate corresponding parts, Fig. 1 is a flow sheet showing one embodiment of the invention in connection with a complete raffinate or extract evaporation system for recovery of $SO_2$;

Figure 1:
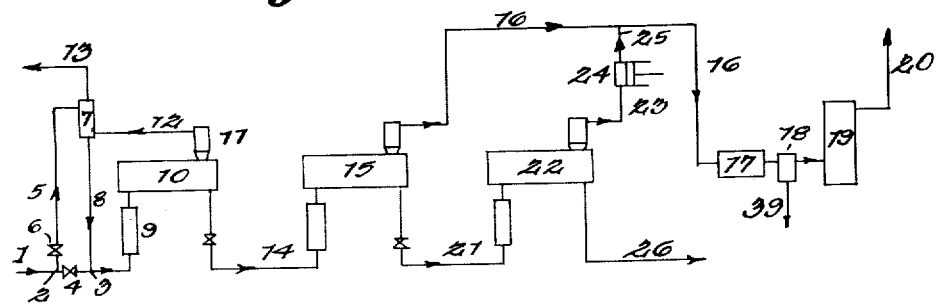
Figure 2:
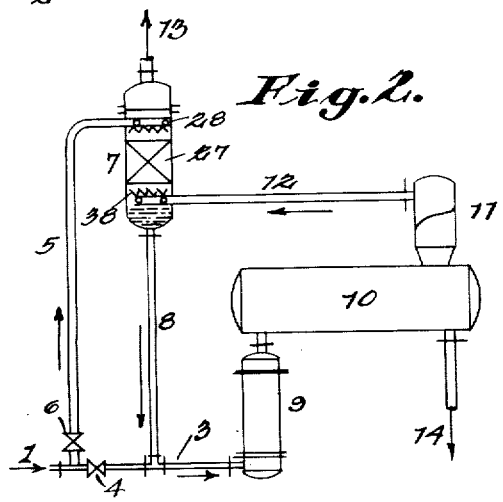
Fig. 2 is an enlarged vertical diagrammatic representation of the contact device and first stage evaporator shown in Fig. 1.

In the first embodiment of the invention selected for illustration and shown in Figs. 1 and 2 of the drawings, referring to Fig. 1, the raffinate or extract solution from the mixer (not shown) enters the evaporating system through line 1. At junction 2 the line is divided, line 3, controlled by valve 4 leads to the heating device 9 of condenser-pressure first stage evaporator 10, while line 5, controlled by valve 6, leads to contact device 7. Line 12 leads the $SO_2$ vapors from dome 11 of evaporator 10 to the contact device 7, and $SO_2$ outlet line 13 which leads from the top of the contact device. Line 8 connects the bottom of the contact device to line 3.

The quantity of raffinate or extract, as the case may be, necessary for the contact device is controlled by the two regulating valves 4 and 6 and is diverted from line 1 into line 5 leading to the contact device. The undiverted raffinate or extract flows through line 3 and is heated in heating device 9 before passing into evaporator 10. Here a portion of the $SO_2$ contained in the raffinate or extract is freed and rises as a vapor into dome 11, together with a certain amount of water and light oil vapors.

Referring now particularly to Fig. 2, the mixed vapors pass by line 12 into the bottom of contact device 7, which is shown in the form of a scrubber, and are directed upwardly by inlet 38. The scrubbing liquid, entering the top of scrubber 7 by line 5, is directed downwardly as a spray by means of sprinkler 28, and passes countercurrently to the ascending $SO_2$ vapors from the evaporator. Filling material 27, disposed between the sprinkler 28 and vapor inlet 38, serves to effect a more intimate and complete contacting between the descending scrubbing liquid and the ascending $SO_2$ vapors.

The action of the scrubbing liquid is to remove the water and oil vapors from the $SO_2$ vapors, so that a substantially pure $SO_2$ gas reaches the top of the scrubber and is withdrawn through line 13 at condenser pressure.

The scrubbing liquid, together with water and oil withdrawn from the $SO_2$ vapors, leaves the bottom of the scrubber or contact device 7 by line 8 and joins the raffinate or extract entering heater 9 by line 3. In this way none of the water and light oil contained in the raffinate and extract is permitted to escape from the corresponding first stages of the respective raffinate and extract evaporation systems.

Referring again to Fig. 1, the raffinate or extract, as the case may be, leaves condenser-pressure evaporator 10 by line 14, freed of a certain amount of $SO_2$, but still containing all of its original water and light oils.

Line 14 leads to atmospheric-pressure evaporator 15. The $SO_2$ vapors leaving from this stage are very rich in water and light oil vapors, since none were withdrawn in the previous stage, and are withdrawn from evaporator 15 by line 16 which leads into gas cooler 17 and light oil separator 18, which serve as a partial condenser to remove the oil vapor constituents. The condensed oil is withdrawn from separator 18 by line 39. The remaining vapors pass into dryer 19, where the water constituent is removed, and leave by line 20 as a substantially pure $SO_2$ gas.

The unevaporated raffinate or extract flows from evaporator 15 by line 21 to vacuum evaporator 22, where the remaining $SO_2$ content is evaporated off, together with a certain amount of water and light oil. These vapors leave by line 23 and are raised by gas pump 24 to the pressure of the vapors in line 16, to which they are then joined by means of line 25. It will thus be seen that oil separation means 17, 18, and dryer 19, serve to purify the vapors from both atmospheric pressure evaporator 15 and vacuum evaporator 22. Line 26 serves for withdrawing the raffinate or extract from last stage (vacuum) evaporator 22.

It is evident that the raffinate or extract from the mixer, entering the evaporation system by line 1, leaves the system by line 26 freed of its $SO_2$ content. And that the extracted $SO_2$ leaves the system by lines 13 and 20 as a substantially pure $SO_2$ gas fit for reuse (after liquefaction) in the main treatment cycle.

Figure 3:
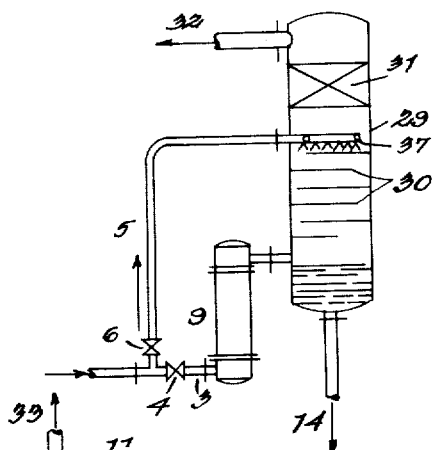
Fig. 3 shows a second form of first stage evaporator and contact means.

Fig. 3 shows a second form of the invention wherein first stage condenser-pressure evaporator 10 and contact device 7 (shown in Figs. 1 and 2) are replaced by a combined vertical evaporator and contact device 29. The remainder of the system is as shown in Fig. 1.

As before, the raffinate or extract from the mixer enters by line 1 and is divided into two parts. A portion flows directly by line 3 (controlled by valve 4) through heater 9 into the lower portion of vertical evaporator-contactor 29 where a certain amount of the $SO_2$ content is freed and rises as a vapor, together with a quantity of water and light oil vapors. The diverted portion of the raffinate or extract from line 1 flows by line 5 (controlled by valve 6) to the upper middle portion of evaporator-contactor 29, where it is directed downwardly as a spray by sprinkler 37, and falls countercurrently to the ascending $SO_2$ vapors which are thereby scrubbed substantially free of water and oil vapor content. Baffle plates 30 are disposed below sprinkler 37 and increase the contacting efficiency. Filling material 31 is placed above the sprinkler and serves to retain any raffinate or extract parts which may have been pulled along with the $SO_2$ vapors. Line 32 withdraws substantially pure $SO_2$ gas at condenser-pressure from the top of the evaporator-contactor. The unevaporated raffinate or extract leaves by line 14 for further treatement as shown in Fig. 1.

It will be seen that in this embodiment the contacting or scrubbing liquid, together with the water and oil extracted from the $SO_2$ vapors, passes directly down into the evaporating liquid, and it is not led through the heater 9 as in the first embodiment.

Figure 4:
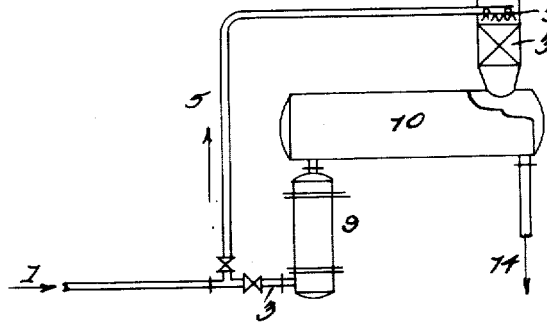
Fig. 4 shows a third form of the same.

Fig. 4 shows a third form of the invention wherein the contacting means are installed in dome 11 of the condenser-pressure evaporator 10 shown in Figs. 1 and 2. As in the first form, also shown in Figs. 1 and 2, the raffinate or extract entering the evaporating system by line 1 is divided into two portions, one of which flows directly by line 3 through heater 9 into evaporator 10 in which part of the $SO_2$ content is freed and rises as a vapor, together with a quantity of water and light oil vapors, into dome 11. The diverted portion of the raffinate or extract flows through line 5 into the upper part of dome 11 and is directed downwardly by sprinkler 35, descending countercurrently to the ascending vapors and scrubbing them free of water and oil constituents. Filling material 36 is placed below the sprinkler so as to increase the efficiency of the contacting or scrubbing. Substantially pure $SO_2$ gas at condenser-pressure leaves the top of dome 11 by line 33. As in the second form of the invention, shown in Fig 3, the scrubbing liquid, together with water and oil withdrawn from the $SO_2$ vapors, descends directly into the evaporating liquid. Line 14 serves to withdraw the unevaporated raffinate or extract for further treatment as shown in Fig. 1.

Figure 5:
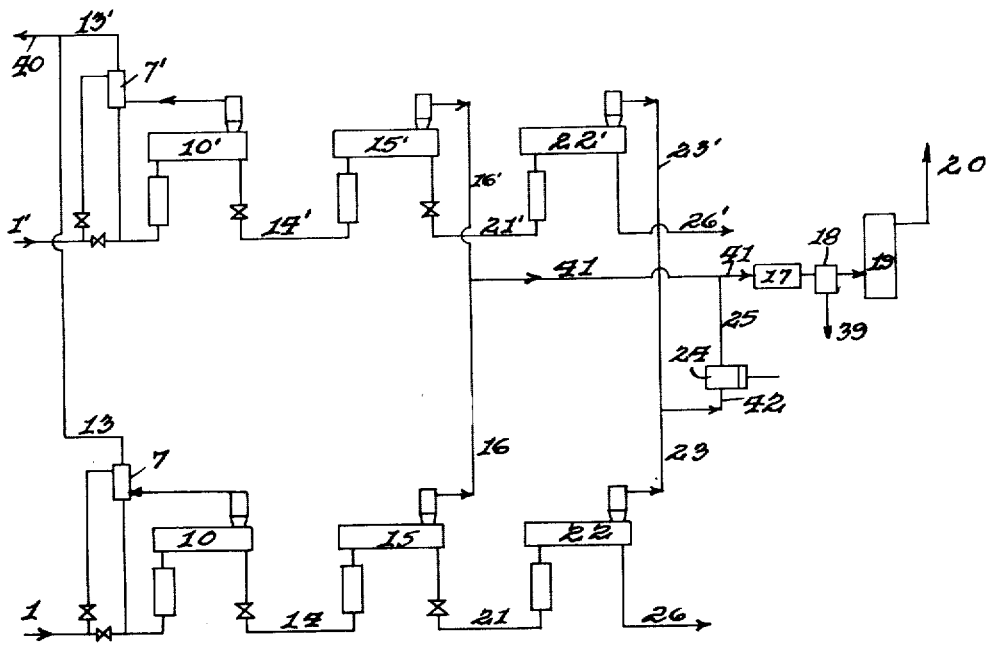
Fig. 5 is a flow sheet showing the invention in connection with a complete raffinate and extract evaporation system for recovery of water-free $SO_2$.

Fig. 5 shows a complete set up for the separation of water-free $SO_2$ from both the raffinate and extract. Two evaporation systems, each according to the form shown in Fig. 1, are employed, one for the raffinate and one for the extract.

The evaporation system shown in the lower half of Fig. 5 is identical with the evaporation system shown in Fig. 1 and the same reference characters are used to designate the corresponding parts. The evaporation system shown in the upper half of Fig. 5 is also identical and the corresponding parts are designated by the same reference characters primed.

Assuming the extract from the mixer to enter the evaporation system comprising evaporators 10, 15 and 22 and contact device or scrubber 7, water-free $SO_2$ gas at condenser pressure will pass from scrubber 7 by line 13. In the same way, water-free $SO_2$ gas at condenser pressure will leave by line 13' from the raffinate evaporation system comprising evaporators 10', 15' and 22' and scrubber 7', into which raffinate from the mixer enters by line 1'. The $SO_2$ gas in lines 13 and 13' is combined in line 40 and is ready for direct condensation at cooling water temperatures and subsequent reuse in the refining system.

The extract and raffinate, freed of a certain amount of $SO_2$ but containing all of the original water and light oils, flows from evaporators 10 and 10', respectively, and passes to atmospheric pressure evaporators 15 and 15' by way of lines 14 and 14'. The $SO_2$ vapors leaving from these evaporators, by lines 16 and 16', are rich in water and light oil vapors and flow into line 41.

The extract and raffinate flow from evaporators 15 and 15', by way of lines 21 and 21', into vacuum evaporators 22 and 22', respectively, where the remaining $SO_2$ content is evaporated off, together with a certain amount of water and light oils. These vapors leave by lines 23 and 23' and are brought together in line 42 and are then compressed up to atmospheric pressure by pump 24, from which they flow through line 25 into line 41, joining the $SO_2$ vapors from the atmospheric pressure evaporators.

The combined $SO_2$ vapors in line 41 are then led into gas cooler 17 and light oil separator 18, which serve as a partial condenser to remove the oil vapor constituents. The condensed oil is withdrawn from separator 18 by line 39. The remaining vapors pass into dryer 19, where the water constituent is removed, and leave by line 20 as a substantially pure $SO_2$ gas.

The purified extract leaves its evaporation system by line 26 and the purified raffinate leaves its evaporation system by line 26'.

It will be obvious that the contact devices previously described, and illustrated in Figs. 3 and 4, may be substituted for the form shown in Figs. 1 and 2, embodied in the system just described and illustrated in Fig. 5.

The advantage of the system shown in Fig. 5 is that only one gas pump 24, gas cooler 17, light oil separator 18 and drying device 19, are used for the $SO_2$ vapors from both the extract and raffinate evaporation systems.

In some installations it may be advantageous to equip all evaporators with contact devices such as above described. With the lower pressure evaporators it would be of advantage in this case to use a part of the finished product (extract or raffinate) as sprinkling liquid. Or it may be found necessary to use contact devices only for the extract evaporators as the amount of $SO_2$ carried off by the raffinate is not relatively great.

The invention obviously is not restricted to the particular embodiments thereof herein illustrated and described.

Having disclosed three illustrative embodiments of the invention, what is claimed and desired to be secured by Letters Patent is as follows:

1. In the process for continuous treatment of hydrocarbons with liquid-$SO_2$, or the like, the method of recovering the $SO_2$ contained in hydrocarbon mixtures containing moisture, comprising the steps of subjecting the mixture to multi-stage evaporation for removal of the $SO_2$ therefrom, the first stage being at condenser pressure and succeeding stages at not greater than atmospheric pressure, returning the water and hydrocarbons contained in the $SO_2$ vapors evolved from the first stage to the evaporation system, and removing the water and hydrocarbons contained in the $SO_2$ vapors evolved from said succeeding stages but without returning the removed water to the evaporation system, whereby the $SO_2$ is recovered as a substantially pure gas for condensation and reuse in the treatment cycle.

2. In the process for continuous treatment of hydrocarbons with liquid-$SO_2$, or the like, the steps comprising subjecting the moisture containing raffinate and extract from the mixer to separate muti-stage evaporation for removal of the $SO_2$ therefrom, the respective first stages being at condenser-pressure and the succeeding stages at not greater than atmospheric pressure, removing the water and hydrocarbons from the $SO_2$ vapors evolved from the first stages by scrubbing with raffinate and extract from the mixer, respectively, introducing the liquid products of said scrubbing into the evaporation systems, and removing the water and hydrocarbons contained in the $SO_2$ vapors evolved from said succeeding stages but without returning the removed water to the evaporation system, whereby the $SO_2$ is recovered as a substantially pure gas for condensation and reuse in the treatment cycle.

3. An improvement in the system for continuous treatment of liquid hydrocarbons with liquid-$SO_2$, comprising subjecting the raffinate and extract from the mixer to separate multi-stage evaporation for removal of the $SO_2$ therefrom, the respective first stages being at condenser pressure and the succeeding stages at not greater than atmospheric pressure, removing the water and hydrocarbons from the $SO_2$ vapors evolved from the first stages by contacting said vapors with cool raffinate and extract from the mixer, respectively, introducing the liquid products of said contacting into the respective evaporation systems, collecting the $SO_2$ vapors evolved from the succeeding stages, uniting at atmospheric pressure said vapors from the succeeding stage, and removing the hydrocarbons and water therefrom but without returning the removed water to the evaporation system, whereby the $SO_2$ is recovered as a substantially pure gas for condensation and reuse in the treatment cycle.

4. An improvement in the system for continuous treatment of liquid hydrocarbons with liquid-$SO_2$, comprising subjecting the moisture containing raffinate and extract from the mixer to separate multi-stage evaporation for removal of the $SO_2$ therefrom, the respective first stages being at condenser pressure and the succeeding stages at not greater than atmospheric pressure, contacting the $SO_2$ vapors evolved from the respective first stages with a portion of the raffinate and extract en route from the mixer to the evaporation systems so as to secure the return of the hydrocarbons and water contained in said vapors, collecting the $SO_2$ vapors evolved from the succeeding stages, uniting at atmospheric pressure said vapors from the succeeding stages and condensing out the hydrocarbons present, followed by drying the $SO_2$, but without returning the removed water to the evaporation system to secure substantially pure $SO_2$ gas for condensation and reuse in the treatment cycle.

5. In combination with the process for continuous treatment of liquid hydrocarbons with liquid-$SO_2$, the method of separating and purifying the $SO_2$ contained in the raffinate and extract so as to permit of repeated use in the treatment cycle, comprising subjecting the raffinate and extract from the mixer to separate multi-stage evaporation, the respective first stages being at condenser pressure, the second at atmospheric pressure and the final under vacuum, scrubbing the $SO_2$ vapors evolved from the respective first stages with a portion of the raffinate and extract en route from the mixer to the evaporation systems so as to secure the return of the hydrocarbons and water contained in said vapors, collecting and compressing to atmospheric pressure the $SO_2$ vapors evolved from the final stages and uniting the same with the $SO_2$ vapors collected from the second stages, respectively, condensing out the hydrocarbons therein, and lastly drying the $SO_2$ gas from said second and final stages but without returning the removed water to the evaporation system.

6. The method specified in claim 3, wherein the $SO_2$ vapors from the condenser-pressure first stage evaporators are conducted to separate towers and therein contacted with countercurrent sprays of cool raffinate and extract, respectively, from the mixer, the contacting liquids, together with included hydrocarbons and water extracted from the $SO_2$ vapors, being then led to the inputs of the respective first stage evaporators.

7. The method specified in claim 3, wherein the first stages of evaporation are performed in vertical chambers into the upper parts of which are introduced respective descending sprays of cool raffinate and extract from the mixer for contacting with the ascending $SO_2$ vapors and rendering them free of hydrocarbons and water.

8. The method specified in claim 3, wherein descending sprays of cool raffinate and extract from the mixer are introduced into the respective domes of horizontal first stage evaporators for contacting the $SO_2$ vapors ascending to $SO_2$ outlets in the tops of said domes, whereby said $SO_2$ vapors are rendered free of hydrocarbons and water.

9. The method specified in claim 5, wherein the raffinate and extract to be evaporated in the respective first stages are first heated and then allowed to evaporate in respective horizontal chambers, the $SO_2$ vapors therefrom being conducted to towers and scrubbed by descending sprays of a portion of the cool raffinate and extract from the mixer, which materials, together with included hydrocarbons and water, are then joined with the remainder of the raffinate and extract from the mixer and introduced, after heating, into the respective first stage evaporators.

10. The method specified in claim 5, wherein the raffinate and extract to be evaporated in the respective first stages are first heated and then allowed to evaporate in respective vertical chambers into the upper parts of which are introduced descending sprays of a portion of the cool raffinate and extract from the mixer for scrubbing the ascending $SO_2$ vapors and returning the hydrocarbons and water contained therein to the raffinate and extract in the evaporators.

11. The method specified in claim 5, wherein the raffinate and extract to be evaporated in the respective first stages are first heated and then allowed to evaporate in respective horizontal chambers provided with $SO_2$ outlet domes into which are introduced respective descending sprays of a portion of the cool raffinate and extract from the mixer for scrubbing the $SO_2$ vapors ascending through the dome and returning the hydrocarbons and water contained therein to the raffinate and extract in the evaporators.

12. An improvement in the system for continuous treatment of liquid hydrocarbons with liquid-$SO_2$, comprising subjecting the moisture containing raffinate from the mixer to multi-stage evaporation for removal of the $SO_2$ therefrom, the first stages being at condenser pressure and the succeeding stages at not greater than atmospheric pressure, removing the water and hydrocarbons from the $SO_2$ vapor evolved from the first stage by contacting said vapors with cool raffinate from the mixer, introducing the liquid products of said contacting into the evaporating system, collecting the $SO_2$ vapors evolved from the succeeding stages, uniting at atmospheric pressure said vapors from the succeeding stages, and removing the hydrocarbons and water therefrom but without returning the removed water to the evaporation system, whereby the $SO_2$ is recovered as a substantially pure gas for condensation and reuse in the treatment cycle.

13. An improvement in the system for continuous treatment of liquid hydrocarbons with liquid-$SO_2$, comprising subjecting the moisture containing extract from the mixer to multi-stage evaporation for removal of the $SO_2$ therefrom, the first stage being at condenser pressure and the succeeding stages at not greater than atmospheric pressure, removing the water and hydrocarbons from the $SO_2$ vapors evolved from the first stage by contacting said vapors with cool extract from the mixer, introducing the liquid products of said contacting into the evaporating system, collecting the $SO_2$ vapors evolved from the succeeding stages, uniting at atmospheric pressure said vapors from the succeeding stages, and removing the hydrocarbons and water therefrom but without returning the removed water to the evaporation system, whereby the $SO_2$ is recovered as a substantially pure gas for condensation and reuse in the treatment cycle.

14. In combination with the process for continuous treatment of liquid hydrocarbons with liquid-$SO_2$, the method of separating and purifying the $SO_2$ contained in the raffinate so as to permit of repeated use in the treatment cycle, comprising subjecting the moisture containing raffinate from the mixer to multi-stage evaporation, the first stage being at condenser pressure, the second at atmospheric pressure and the final under vacuum, scrubbing the $SO_2$ vapors evolved from the first stage with a portion of the raffinate en route from the mixer to the evaporation system so as to secure the return of the hydrocarbons and water contained in said vapors, collecting and compressing to atmospheric pressure the $SO_2$ vapors evolved from the final stage and uniting the same with the $SO_2$ vapors collected from the second stage, condensing out the hydrocarbons therein, and lastly drying the $SO_2$ gas from said second and final stages but without returning the removed water to the evaporation system.

15. In combination with the process for continuous treatment of liquid hydrocarbons with liquid-$SO_2$, the method of separating and purifying the $SO_2$ contained in the extract so as to permit of repeated use in the treatment cycle, comprising subjecting the moisture containing extract from the mixer to multi-stage evaporation, the first stage being at condenser pressure, the second at atmospheric pressure and the final under vacuum, scrubbing the $SO_2$ vapors evolved from the first stage with a portion of the extract en route from the mixer to the evaporation system so as to secure the return of the hydrocarbons and water contained in said vapors, collecting and compressing to atmospheric pressure the $SO_2$ vapors evolved from the final stage and uniting the same with the $SO_2$ vapors collected from the second stage, condensing out the hydrocarbons therein, and lastly drying the $SO_2$ gas from said second and final stages but without returning the removed water to the evaporation system.

In testimony whereof, I have signed my name to this specifiation.

GIUSEPPE CATTANEO.

CERTIFICATE OF CORRECTION.

Patent No. 1,913,658.  June 13, 1933.

GIUSEPPE CATTANEO.

It is hereby certified that error appears in the printed specification of the above numbered patent requiring correction as follows: Page 1, line 35, for "compresed" read "compressed"; and line 67, after "with" insert "the"; page 4, line 30, claim 2, for "muti-stage" read "multi-stage"; lines 50 and 99, claims 3 and 5, before "raffinate" insert "moisture containing"; and that the said Letters Patent should be read with these corrections therein that the same may conform to the record of the case in the Patent Office.

Signed and sealed this 15th day of August, A. D. 1933.

M. J. Moore.

(Seal)  Acting Commissioner of Patents.

tem so as to secure the return of the hydrocarbons and water contained in said vapors, collecting and compressing to atmospheric pressure the $SO_2$ vapors evolved from the final stage and uniting the same with the $SO_2$ vapors collected from the second stage, condensing out the hydrocarbons therein, and lastly drying the $SO_2$ gas from said second and final stages but without returning the removed water to the evaporation system.

In testimony whereof, I have signed my name to this specifiation.

GIUSEPPE CATTANEO.

CERTIFICATE OF CORRECTION.

Patent No. 1,913,658.     June 13, 1933.

GIUSEPPE CATTANEO.

It is hereby certified that error appears in the printed specification of the above numbered patent requiring correction as follows: Page 1, line 35, for "compresed" read "compressed"; and line 67, after "with" insert "the"; page 4, line 30, claim 2, for "muti-stage" read "multi-stage"; lines 50 and 99, claims 3 and 5, before "raffinate" insert "moisture containing"; and that the said Letters Patent should be read with these corrections therein that the same may conform to the record of the case in the Patent Office.

Signed and sealed this 15th day of August, A. D. 1933.

M. J. Moore.

(Seal)     Acting Commissioner of Patents.

CERTIFICATE OF CORRECTION.

Patent No. 1,913,658.  June 13, 1933.

GIUSEPPE CATTANEO.

It is hereby certified that error appears in the printed specification of the above numbered patent requiring correction as follows: Page 1, line 35, for "compresed" read "compressed"; and line 67, after "with" insert "the"; page 4, line 30, claim 2, for "muti-stage" read "multi-stage"; lines 50 and 99, claims 3 and 5, before "raffinate" insert "moisture containing"; and that the said Letters Patent should be read with these corrections therein that the same may conform to the record of the case in the Patent Office.

Signed and sealed this 15th day of August, A. D. 1933.

M. J. Moore.

(Seal)  Acting Commissioner of Patents.